(No Model.)
2 Sheets—Sheet 1.
S. E. ROBINSON.
OVEN AND FLAT IRON HEATER.
No. 401,969.
Patented Apr. 23, 1889.
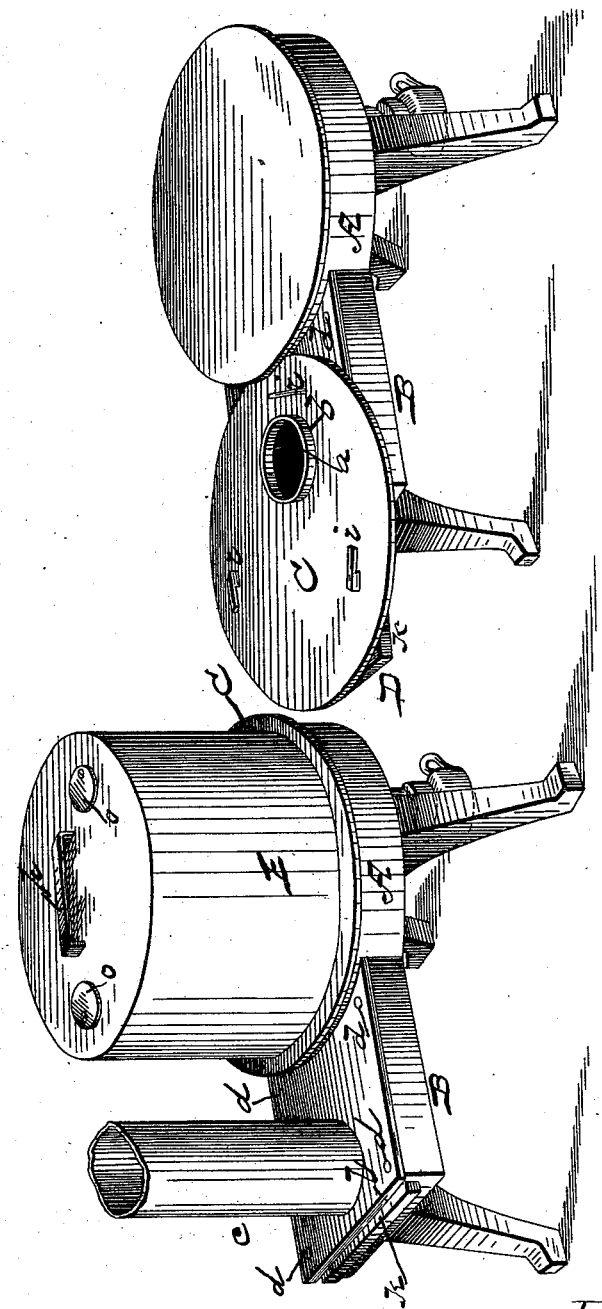
Witnesses.
Arthur Ashley.
Jas. H. Scott
Inventor.
S. E. Robinson
by E. H. Bates (No Model.) 2 Sheets—Sheet 2.

S. E. ROBINSON.
OVEN AND FLAT IRON HEATER.

No. 401,969. Patented Apr. 23, 1889.

Witnesses.
Arthur Ashley
Jas. H. Scott

Inventor
S. E. Robinson
by E. H. Bates

UNITED STATES PATENT OFFICE.

SYLVANUS E. ROBINSON, OF NEWARK, NEW JERSEY.

OVEN AND FLAT-IRON HEATER.

SPECIFICATION forming part of Letters Patent No. 401,969, dated April 23, 1889.

Application filed January 30, 1889. Serial No. 298,107. (No model.)

*To all whom it may concern:*

Be it known that I, SYLVANUS E. ROBINSON, a citizen of the United States, residing at Newark, in the county of Essex and State of New Jersey, have invented certain new and useful Improvements in Oven and Flat-Iron Heaters; and I do hereby declare the following to be a full, clear, and exact description of the invention, such as will enable others skilled in the art to which it appertains to make and use the same.

This invention relates to improvements in portable cooking and heating stoves; and it consists in the novel construction and arrangement of the same, all as will be hereinafter fully described.

The annexed drawings, to which reference is made, fully illustrate my invention, in which—

Figure 3:
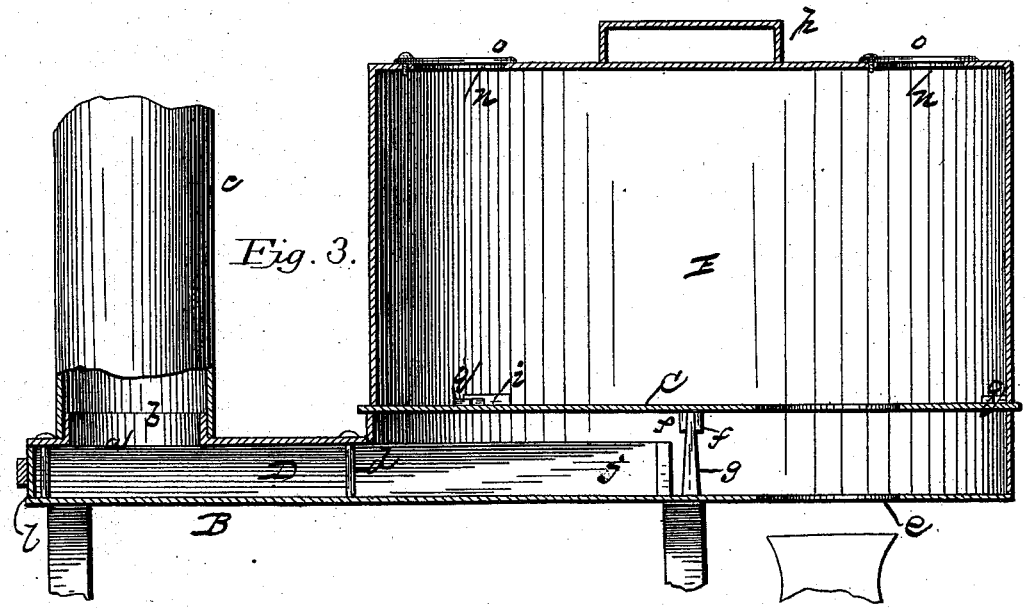
Figure 4:
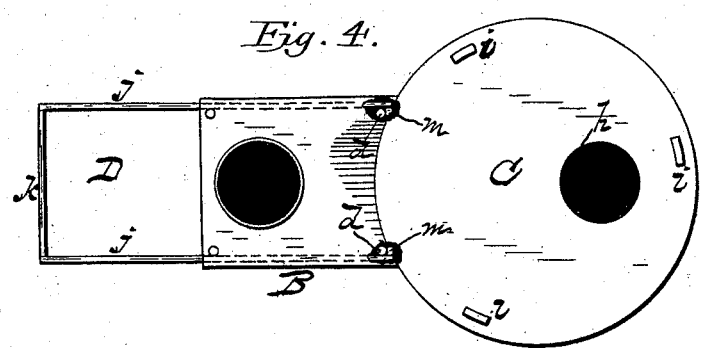
Figure 5:
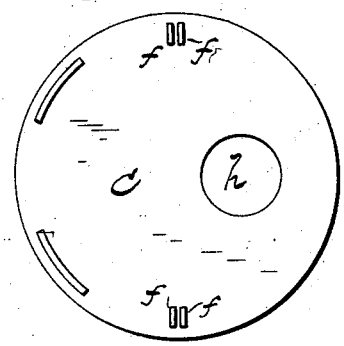

Figure 1 represents a perspective view of my device having the oven attached. Fig. 2 is a perspective view of the same, showing the oven removed and stove-plate shifted. Fig. 3 is a vertical sectional view. Fig. 4 is a plan view, and Fig. 5 is a bottom view, of the stove-plate.

Referring by letter to the accompanying drawings, A designates the body of the stove, having the rearwardly-extending portion B, forming a horizontal flue, having the opening $a$, around which is the flange $b$, for supporting the chimney $c$. On the top of the extension is placed a removable plate, which is secured to the body by screws or bolts $d$. In the bottom of the stove-body is an opening, $e$, through which the top of a lamp-chimney projects, whereby heat is introduced into the said body. The body is provided with a removable cover or lid, C, which has on its under side lugs $f$, which engage lugs $g$ on the inner wall of the stove-body and serve when so engaged to prevent the lid from turning. This lid has an opening, $h$, in it as well as cleats $i$ on its upper face, for a purpose hereinafter set forth.

Within the extended portion of the body is arranged a sliding support or rest, D, composed of two side bars, $j\ j$, and an end bar, $k$, which connects said bars $j\ j$. This frame D passes through an opening, $l$, in the rear wall of the extension, and the front ends of the side bars have stops $m\ m$, which engage the screws or bolts when said frame is drawn out, thereby limiting its outward movement.

E represents an oven, which is open at the bottom and closed at the top, in which latter are small openings $n\ n$, having pivoted covers or lids $o\ o$. A handle, $p$, is provided, whereby said oven can be removed from the body. On the inner walls of this oven are cleats $q\ q$, which engage the cleats on the lid and serve to connect removably the lid to said oven. This body is provided with suitable supports or legs.

It will be seen that in placing the oven upon the lid and giving the oven a slight turn the same are locked together, and the oven and plate may be removed together, which latter, when so connected, forms a bottom to said oven.

It will be observed that the oven can be shifted from front to rear of the stove by removing the stove-pipe, and after which drawing rearwardly the sliding support and placing the removable cover upon it with the opening in said cover engaging the flanged stove-pipe opening on the rear extension, and a common plate or lid is substituted for said shifting-plate, thus covering the top of the body, thereby providing at the front of the stove or body means for heating or cooking, and at the same time a heated oven is provided in the rear, and the openings in the top of the oven serve to create draft. By the construction of my stove the same takes up very little space in shipping, and when the rest or support is not in use it is forced within the body and out of sight, and by the connecting of the plate and oven the same form a closet, which, when the draft and heat are regulated, serves as a warming-closet.

Having described my invention, what I claim, and desire to secure by Letters Patent, is—

1. A portable stove having a rear extension forming a flue and provided with a sliding support or shelf, for the purpose set forth.

2. The stove provided with the rear extension forming a horizontal flue, a sliding support therein provided with end stops to limit the extension of the support when drawn out, as and for the purpose set forth.

3. In a portable stove, the same provided with the lugs $q$ on its inner face or wall, adapted to engage lugs $ff$ on the stove-plate, as and for the purpose set forth.

4. The oven provided with the fastening-lugs $q$ on its wall and the lugs $i$ on the stove-plate, in combination with the lugs $g$ on the inner wall of the stove-body, and the lugs $ff$ on the stove-plate, the whole adapted to operate as and for the purpose set forth.

5. The within-described portable stove, consisting of the body constructed with a rear extension forming a horizontal flue, a sliding frame or shelf within this flue having stop-lugs, the inner wall of the body provided with the lugs, the removable plate having lugs on its under side and fastening-lugs on its upper face, said plate adapted to serve the double purpose of a plate for said stove and a bottom for the oven, which latter is provided with the openings in the top having lids, a handle for removing it, and fastening-lugs on its wall to engage the lugs on the plate, all as and for the purposes set forth.

In testimony whereof I affix my signature in presence of two witnesses.

SYLVANUS E. ROBINSON.

Witnesses:
 ISAAC BANISTER,
 E. A. KNIGHT.